Patented Oct. 31, 1933

1,933,227

UNITED STATES PATENT OFFICE 1,933,227

RECOVERY OF PULP FROM WASTE PAPER

Francis H. Snyder, Niagara Falls, N. Y., and Stanley F. M. Maclaren, Niagara Falls, Ontario, Canada, assignors to Industrial Research Limited, Niagara Falls, Ontario, Canada, a corporation of Ontario No Drawing. Application November 10, 1931
Serial No. 574,227

7 Claims. (Cl. 92—9)

This invention relates to the recovery of pulp from waste paper such as old magazine stock and old newspapers.

The principal object of this invention is to provide a simple, economical and commercially practicable process of converting waste paper into a high grade of pulp.

Other objects and advantages of the invention will become apparent during the course of the following description.

In the preferred practice of the process old magazine stock or old newspapers, and preferably the former, is first treated in any suitable manner to divide the paper into relatively small pieces. This may be accomplished by a conventional shredding device. The exact size of the pieces is not material except that large sheets should not be present in the final product since it is disadvantageous to treat sheets of any great size. In the event that the paper under treatment does not contain a large proportion of colored inks the material is first mixed with a large excess of water. In preferred practice sufficient water is added to provide about a 4 per cent. suspension of solids in liquid. The resulting suspension is introduced into, or may be formed in, an ordinary paper beater where it is treated with a purifying composition of the character hereinafter described in detail.

In the event that the waste paper contains a large proportion of colored inks it is advisable to subject the paper to a preliminary treatment with a solvent for linseed oil varnish such as is present in printer's ink. This is accomplished by introducing the waste paper into a hopper and passing a solvent such as benzol, carbon tetrachloride, ethylene dichloride or the like through the body of the paper, the solvent being recovered for reuse. While the proportion of solvent employed may be varied considerably we have found it advantageous to use approximately one ton of solvent to each ton of old paper treated. After the solvent has been permitted to drain from the paper in the hopper, the paper is removed therefrom and permitted to stand for about one-half hour before subsequent treatment. Following this period of standing the mass is introduced into a closed type beater such as a rotary digester or rod mill where it is treated in the manner hereinafter described.

Whether the paper mass is to be treated in an ordinary open paper beater or a closed type beater, the treatment is substantially the same. A dilute aqueous suspension, say a 4 per cent. solid suspension, is treated with normal sodium silicate ($Na_2SiO_3$) with which may be added an agent to reduce surface tension such as oleic acid, palm oil, rosin oil, sulfonated oils or other soap-forming fatty body. In preferred practice a suspension of approximately one ton of pulp in twenty-five tons of water is treated with from three to four hundred pounds of normal sodium silicate. If a soap-forming fatty body is employed to reduce surface tension, approximately from 25 to 50 pounds of such agent are added. The temperature of operation is not of great importance but we recommend that the mass under treatment be maintained at about 25° C. since somewhat improved results appear to be obtained when the stock is treated at about this temperature.

After the stock has been subjected to a beating action for about 20 to 30 minutes the mass is run on to a wheel washer, screen, wet machine or the like where it is thoroughly washed first with relatively hot water and later with cold water. Following the washing the solid mass is separated from the excess of liquid present and is subjected to the action of a bleaching agent, say a one per cent. chlorine bleach, after which the material is stored in a chest or other container until ready for use, the bleaching agent preferably being maintained in contact with the mass during the period of storage.

The foregoing treatment produces a remarkably white pulp and one of very superior quality particularly when made from a good grade of magazine stock. All that remains to be done to convert the material into condition for reuse in the manufacture of paper is to remove extraneous matter such as wire staples, and the like therefrom and form the material into sheets of pulp for ready handling. This is accomplished preferably by washing the chemically treated stock over riffles and through pulp screens and passing the fibrous material on to a paper machine or wet machine to form laps or sheets of pulp.

Repeated tests have demonstrated that the foregoing treatment not only removes all ink and provides a white pulp but also that the fibers are not deleteriously affected by the process. Accordingly, it has been found that the pulp may be utilized as raw material in the manufacture of high grade paper.

Cross reference is hereby made to our copending application Serial No. 575,972, filed November 18, 1931.

While we have described in detail the preferred practice of our process it is to be understood that the details of procedure may be variously modified without departing from the spirit of the invention or the scope of the subjoined claims.

We claim:

1. The process of reclaiming fiber from waste paper which comprises subjecting the waste paper to the action of a solvent for linseed oil varnish, and subsequently subjecting a dilute aqueous suspension of the treated paper to a mechanical beating action in the presence of sodium silicate.

2. The process of reclaiming fiber from waste paper which comprises subjecting the waste paper to the action of a solvent for linseed oil varnish, and subsequently subjecting a dilute aqueous suspension of the treated paper to a mechanical beating action in the presence of sodium silicate, and a surface tension reducing agent comprising a soap-forming fatty body.

3. The process of reclaiming fiber from waste paper which comprises subdividing the waste paper, subjecting the resulting paper to the action of a solvent for linseed oil varnish, subjecting a dilute aqueous suspension of the resulting paper to a mechanical beating action in the presence of sodium silicate, separating the thus treated fibrous material from the mass, and washing the thus reclaimed fiber.

4. The process of reclaiming fiber from waste paper which comprises subdividing the waste paper, treating the resulting paper with a solvent for linseed oil varnish, subjecting a dilute aqueous suspension of the resulting paper to a mechanical beating action in the presence of sodium silicate, separating the fibrous material from the mass, washing the thus reclaimed fiber, and whitening the fiber by the action of a bleaching agent.

5. The process of reclaiming fiber from waste paper which comprises shredding the waste paper, subjecting the shredded paper to the action of a solvent for linseed oil varnish, subjecting a dilute aqueous suspension of the thus treated paper in a closed type beater to a mechanical beating action in the presence of sodium silicate, separating the fibrous material from the mass, washing the resulting fiber, subjecting the same to the action of a bleaching agent, and washing the bleached fiber while mechanically removing extraneous matter therefrom.

6. The process of reclaiming fiber from waste paper which comprises shredding the waste paper, subjecting the shredded paper to the action of approximately an equal weight of a solvent for linseed oil varnish, draining the solvent from the paper, mixing the thus treated paper with water to provide a suspension of about 4 per cent. solid content, subjecting the resulting fibrous material in suspension to a mechanical beating action in a closed type beater in the presence of normal sodium silicate and a surface tension reducing agent comprising an acidic soap-forming fatty body, the sodium silicate being present in the proportion of approximately three to four hundred pounds of the silicate to each ton of fibrous material treated and the surface tension reducing agent being present in the proportion of approximately from 25 to 50 pounds to each ton of fibrous material treated, separating the thus treated fibrous material from the liquid mass, washing the recovered fiber first with hot water and thereafter with cold water, subjecting the washed fiber to the action of a bleaching agent, washing the bleached fiber while mechanically removing extraneous matter therefrom, and forming a sheet of pulp from the thus reclaimed fiber.

7. In a process of reclaiming fiber from waste paper the improvement which comprises subjecting the waste paper to the action of a solvent for linseed oil varnish, and thereafter subjecting the waste paper in wet pulp form to the action of sodium silicate and an acidic soap-forming fatty body.

FRANCIS H. SNYDER.
STANLEY F. M. MACLAREN.